UNITED STATES PATENT OFFICE.

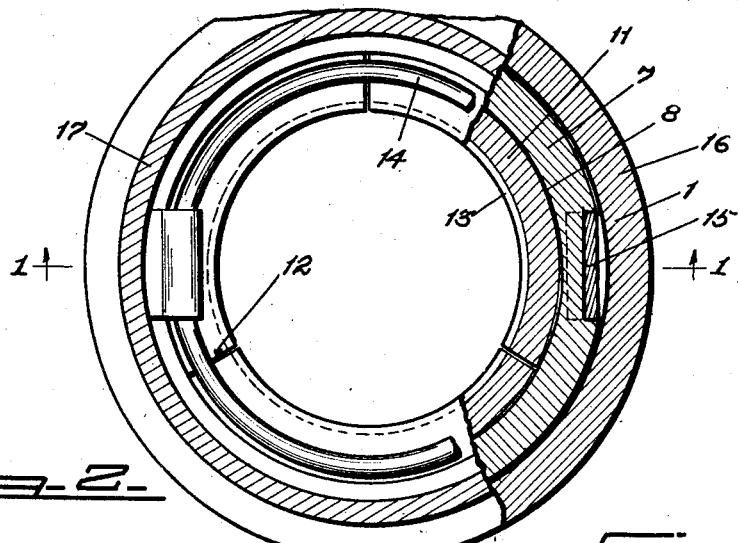
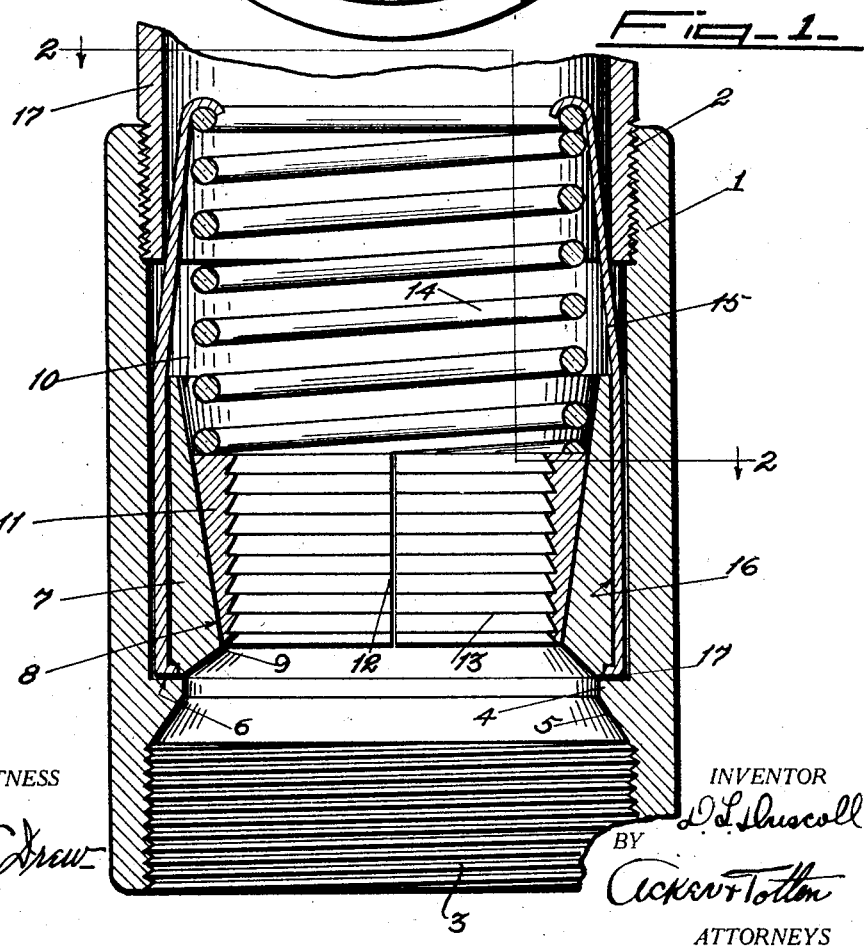

DENNIS L. DRISCOLL, OF COALINGA, CALIFORNIA, ASSIGNOR OF ONE-HALF TO BUNTING IRON WORKS, OF SAN FRANCISCO, CALIFORNIA, A CORPORATION OF CALIFORNIA.

FISHING-TOOL FOR USE IN DRILLING OPERATIONS.

1,394,071.     Specification of Letters Patent.     Patented Oct. 18, 1921.

Application filed May 22, 1920. Serial No. 383,464.

*To all whom it may concern:*

Be it known that I, DENNIS L. DRISCOLL, a citizen of the United States, residing at Coalinga, in the county of Fresno and State of California, have invented certain new and useful Improvements in Fishing-Tools for Use in Drilling Operations, of which the following is a specification.

The present invention relates to an improved type of fishing tool which is adapted for engaging bodies having relatively smooth surfaces and for removing the same from a well when the same become lost therein.

The principal object of the present invention is to provide a tool of this type in the form of a unit structure and which is adapted for coöperation or insertion within and removal from a suitable holder without requiring the alteration or change of the holder. A further object is to provide a construction which is simple, is capable of being cheaply manufactured, and wherein the engaging dogs are maintained in contact with the object by spring pressure and the weight of the object, thus insuring the positive engagement of an object inserted therebetween.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical sectional view of the preferred embodiment of my invention, taken on line 1—1 of Fig. 2. Fig. 2 is a transverse sectional view taken on line 2—2 of Fig. 1.

In the drawings, the numeral 1 is a tubular shell threaded at its upper and lower ends as at 2 and 3 and formed on its interior, adjacent its lower end, with a ring supporting shoulder 4 having an upwardly and inwardly beveled lower surface 5 and a relatively flat top surface 6.

Within the tubular shell 1 is adapted for positioning, as a unit, my improved fishing tool, which consists in the socket ring 7 formed on its interior with an opening having upwardly and outwardly flaring walls 8 providing the opening with a lower end 9 which is of a diameter less than the upper open end 10 thereof. The socket ring is of a diameter preferably corresponding to the interior diameter of the shell 1 above the shoulder 4 to be snugly received therein, as in the drawing.

Positioned within the socket ring 7 are a plurality of dogs 11, illustrated as three in number, and providing, when assembled as in the drawing, an annular vertically split engaging member. The outer wall surface of the engaging member formed by the dogs 11 is in the form of an inverted cone of a diameter, when in its lowermost position within the socket ring, to rest at its lower end at the lower end 9 of the socket ring 7. The side walls or edges of the dogs 11 are preferably vertically disposed, as at 12, to provide abutting surfaces which limit the downward movement of the engaging member within the ring 7, and the interior curved surface of the respective dogs is formed with suitable teeth or serrations 13 for engaging a member received between said dogs. The dogs are normally held downwardly within the socket ring under spring tension by the compression spring 14 positioned over and within the upper end of the socket ring 7, the spring being held under tension at spaced points by the tension straps 15 which are curved over the upper coil of the spring, and the lower ends of which are received in recesses 16 in the peripheral surface of the ring and at their terminus are bent over, as at 17', for reception in seats adjacent the lower end of the socket ring 7.

The fishing tool, above described, is adapted for positioning within the shell 1 through the upper open end thereof, and the lower edge of the ring 7 resting on the supporting surface 6 of the shoulder 4. After this positioning, a suitable support 17, preferably tubular in form, is threaded to the upper end of the shell 1 for lowering the tool within the well casing.

When assembled, as in the drawing, the tool is lowered in the well casing over the body which is desired to be removed therefrom and the frictional contact of the body with the serrations 13 of the dogs 11 raises the dogs against the spring tension within the socket ring on the downward movement of the tool thereover. On the upward movement, the compression spring 14 and the beveled surfaces 8 of the socket ring cause a tight gripping of the dogs over the outer surface of the body to be removed, thus insuring a tight gripping of the body and enabling a body having a relatively smooth exterior surface to be readily removed from within a well casing.

It will be apparent that the normal function of the compression spring 14 is to press the dogs 11 downwardly within the socket ring to form an annular engaging member of small diameter, which is automatically enlarged when the tool is lowered over the object of a diameter receivable within the opening formed by the shoulder 4 and slightly larger than the normal contracted diameter afforded by the annular engaging members. The spring 14 maintains the dogs 11 tightly in contact with the surface of the body received therebetween on the lowering of the tool thereover to insure the tight gripping of the body by the dogs on an upward movement being imparted to the tool, which, due to the coacting inclined faces between the dogs and socket ring forces the serrated faces of the dogs to bite into the surface of the engaged body and grip the same tightly therebetween.

Having thus described my invention, what I claim as new and desire to protect by Letters Patent is:—

1. A fishing tool of the class described, comprising a socket ring formed with an inclined surface, an engaging member positioned therein and consisting of a plurality of engaging dogs movable over the inclined surface to open and closed position, a spring for normally maintaining said engaging member in closed position within the ring and means engaging the spring and the socket ring for maintaining said spring under tension at all times, and for retaining the socket ring dogs and spring together to form a unit structure.

2. A fishing tool of the class described, comprising a socket ring formed with its inner surface upwardly and outwardly inclined, an annular engaging member positioned within the socket ring and consisting of a plurality of engaging dogs movable vertically over said inclined surface, a coiled spring common to all of said engaging dogs for normally maintaining the same in closed position, and means for uniting the spring and ring together to permit the device to be used as a unit with the spring under tension at all times.

3. A fishing tool of the class described comprising a socket ring having an upwardly and outwardly inclined inner surface and a relatively straight outer surface, an engaging member therein movable vertically relatively thereto and formed with an outwardly and upwardly inclined outer surface and a serrated inner surface, a coiled spring overlying and contacting with the upper edge of said engaging member, and means engaging at one end the upper end of said spring and at its opposite end the ring for holding the said spring under tension against said engaging member at all times.

4. A fishing tool of the class described comprising a socket ring having an upwardly and outwardly inclined inner surface and a relatively straight outer surface, an engaging member therein movable vertically relatively thereto, the same formed with an outwardly and upwardly inclined outer surface and a serrated inner surface, a coiled spring received at its lower end within said ring and in contact with the upper edge of said engaging member, and a plurality of tension straps extending at one end over the said spring, and at their opposite end engaging said socket ring for maintaining the spring under tension at all times to force the engaging member downwardly within said ring and to retain the parts together to form a portable unit structure.

In testimony whereof I have signed my name to this specification.

DENNIS L. DRISCOLL.